April 11, 1961 W. HEUCHEMER ET AL 2,979,115
FILM SPLICER
Filed Jan. 24, 1957
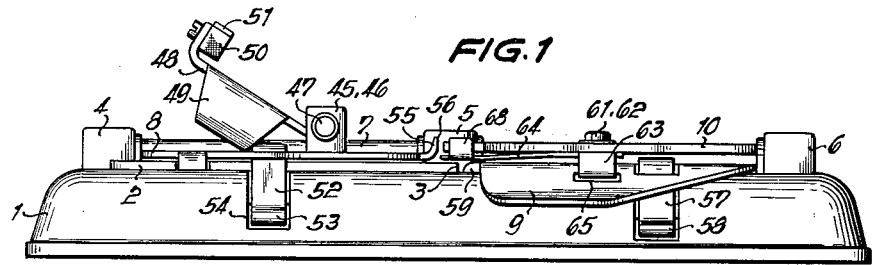
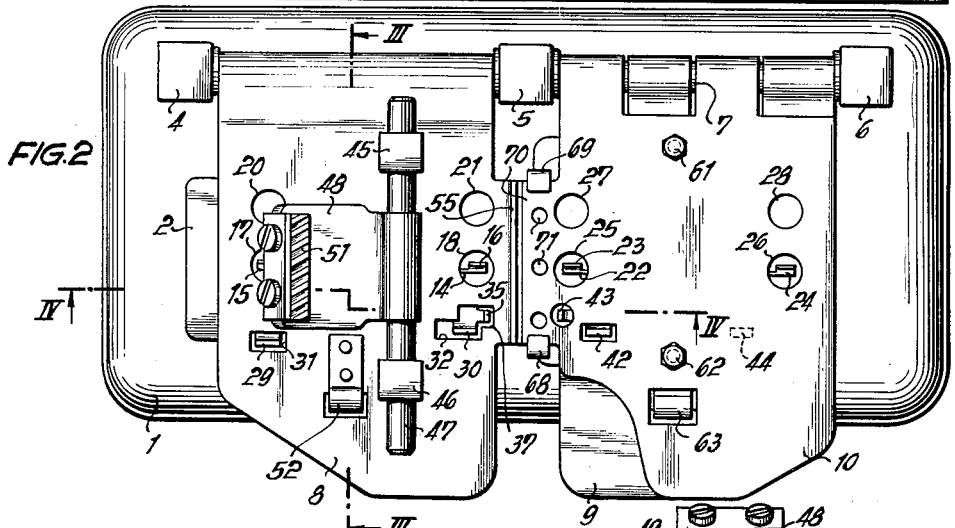
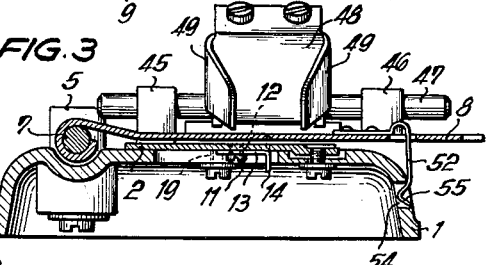
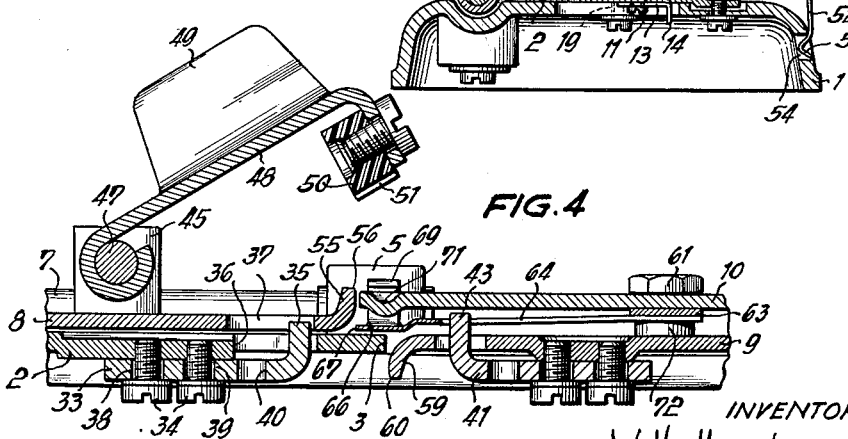
INVENTORS
Willy Heuchemer and
Herbert Reinsch
By Michael S. Striker

# United States Patent Office 2,979,115
Patented Apr. 11, 1961

2,979,115

FILM SPLICER

Willy Heuchemer and Herbert Reinsch, Stuttgart, Germany, assignors to Eugen Bauer G.m.b.H., Stuttgart, Germany Filed Jan. 24, 1957, Ser. No. 636,101

Claims priority, application Germany Feb. 28, 1956

9 Claims. (Cl. 154—42.1)

The present invention relates to splicers which are used, for example, for splicing together free end portions of a pair of film strips, respectively.

With conventional splicers of this type, the quality of the splice is dependent upon the accuracy of manufacture of all of the parts of such a conventional splicer, and furthermore the quality of the splice deteriorates if foreign elements should become lodged between parts of the film splicer which move together. Thus, with a conventional film splicer careful manufacture and very close tolerances of the parts are required in order to assure a high quality splice. Furthermore, care must be taken to keep the splicer clean at all times in order to obtain a high quality splice.

One of the objects of the present invention is to provide a film splicer which guarantees a high quality splice irrespective of the accuracy with which the parts of the splicer are manufactured, so that with the splicer of the invention it is unnecessary to manufacture the parts with the extremely close tolerances which are required by conventional splicers.

Another object of the present invention is to provide a splicer which will provide a high quality splice even if foreign matter should become lodged between elements of the splicer.

An additional object of the present invention is to provide a splicer which is capable of accurately locating the film end portions to be spliced and which also is capable of being used with film of various widths. For example, the splicer of the invention may be adjusted so as to be capable of splicing either 8 mm. film or 16 mm. film.

A still further object of the present invention is to provide a splicer capable of accomplishing all of the above objects and composed of simple and ruggedly constructed elements which are easy and inexpensive to manufacture and assemble and which are very reliable in operation.

With the above objects in view, the present invention mainly consists of a film splicer which includes a pair of plates between which a film end portion to be spliced to another film end portion is adapted to be located. A support means supports these plates for movement to and from an operating position, and a means is provided between said plates for maintaining between said plates a space of a predetermined thickness. A leaf spring of a thickness substantially smaller than these predetermined thicknesses is located between the plates and is carried by one of these plates in a position spaced from both plates so that the leaf spring can freely move toward one or the other of the plates, and this leaf spring has a free end portion which presses together the film end portions during actual splicing thereof. In this way, the splicing pressure is independent of the plates and depends only upon the characteristics of the leaf spring, so that the quality of the splice will not be influenced by the accuracy of the plates or of the means which supports the plates for movement to and from their operating positions.

The novel features which are considered as characteristic for the invention are set forth in particular in the appended claims. The invention itself, however, both as to its construction and its method of operation, together with additional objects and advantage thereof, will be best understood from the following description of specific embodiments when read in connection with the accompanying drawings, in which:

Fig. 1 is a front elevational view of a splicer according to the present invention, Fig. 1 showing a scraper element in an upwardly directed inoperative position;

Fig. 2 is a top plan view of the splicer shown in Fig. 1;

Fig. 3 is a sectional, elevational view taken along the line III—III of Fig. 2 in the direction of the arrows; and Fig. 4 is a sectional, elevational view on an enlarged scale taken along the line IV—IV of Fig. 2 in the direction of the arrows.

Referring to the drawings, it will be seen that the left side of a supporting base 1 carries at its upper face a stationary film supporting plate 2 which may be fixed to the base 1 by suitable screws or the like. The right free edge of the film supporting plate 2 is in the form of a cutting edge 3 (Fig. 4) and is located at a substantially central portion of the base 1. The base 1 fixedly carries three upwardly directed bosses 4, 5 and 6 (Fig. 2) and these bosses carry an elongated shaft 7 which extends horizontally along and over the base 1 and which may be made up of a pair of shaft portions respectively carried between each pair of successive bosses 4, 5 and 6. The left portion of shaft 7, which is located between the bosses 4 and 5, turnably supports a holding plate 8, and the right portion of the shaft 7, which is located between the bosses 5 and 6 turnably supports a pair of plates 9 and 10 for movement to and from an operating position where the plate 9 forms a lower plate and the plate 10 forms an upper plate. Thus, the base 1 together with the bosses 5 and 6 and the shaft 7 form a support means for supporting the plates 9 and 10 for turning movement about a common axis and for movement to and from an operating position where the plates 9 and 10 are located adjacent to the upper part of the base 1.

As may be seen in Fig. 3, a leaf spring 14 is located directly beneath the plate 2 in a plane normal to the latter, and this leaf spring 14 has a horizontally extending extension 13 fastened to the underside of the plate 2 by screws 11 which extend into threaded openings 12 of the plate 2. The free end portions of the leaf spring 14 are widened in order to provide a pair of springy stops 15 and 16 (Fig. 2). The plate 2 and the holding plate 8 are respectively formed with a pair of aligned openings 17 through which springy stop 15 extends, and the plate 2 and the holding plate 8 are respectively formed with a pair of aligned cutouts 18 through which the springy stop 16 extends, these springy stops 15 and 16 extending upwardly from the portion of leaf spring 14 which is located beneath the plate 2. The springy stops 15 and 16 are located in a single straight line and engage a side edge of a film portion to be spliced. The plate 2 has additionally threaded openings 19 which may receive the screws 11 in order to fix the spring 14 to the plate 2 in a different position when it is desired to splice wider film. The plate 2 and the holding plate 8 are provided with a pair of aligned openings 20 and with a pair of aligned openings 21 through which the springy stops 15 and 16 extend (Fig. 2) when the position of the leaf spring 14 is adjusted to adapt the splicer for use with wider film.

A leaf spring 22 (Fig. 2) which may be identical with the leaf spring 14 is fixed to the lower plate 9 in exactly the same way that the leaf spring 14 is fixed to the plate 2, and the leaf spring 22 has widened end portions which form a pair of springy stops 23 and 24 which extend upwardly through a pair of aligned openings 25 and a pair of aligned openings 26. Each pair of aligned openings are respectively formed in the plates 9 and 10, and these plates are formed with additional pair of aligned openings 27 and 28 through which the springy plates 23 and 24 extend when the leaf spring 22 is fixed in a position for accommodating wider film. It will be noted that the stops 15, 16, 23 and 24 are located along a single straight line so that they are adapted to cooperate with one colinear side edge of a pair of film edge portions which are to be spliced together.

The plate 2 carries a pair of rigid stop members 29 and 30 respectively opposite the springy stop members 15 and 16, and these rigid stop members 29 and 30 are respectively visible through the cutouts 31 and 32 of the plate 8 in Fig. 2. The rigid stop member 30 is in the form of an upwardly extending projection of an angle member 33 (Fig. 4) which is adjustably fixed to the plate 2 by the screws 34. The angle member 33 is provided with another upwardly extending projection 35 which acts as a film locating projection and is adapted to pass through a perforation of a film end portion in order to position the latter longitudinally. The stop 30 and the film locating projection 35 pass upwardly through a cutout 36 formed in the plate 2 and into a corresponding cutout 37 formed in the plate 8. The angle member 33 is provided with a row of three openings 38, 39 and 40, so that the stop member 30 as well as the film locating member 35 may be adjusted longitudinally of the film depending upon which pair of openings 38—40 the screws 34 extend through.

A similar angle member 41, which may be identical with the angle member 33, and which has an upwardly extending portion which forms a rigid stop member 42 is connected to the plate 9 in the same way that the angle member 33 is connected to the plate 2, and the angle member 41 is additionally provided with an upwardly extending projection 43 which acts as a film locating member and which is adapted to pass through a perforation of a film end portion located between the plates 9 and 10. It will be noted from Fig. 4 that the plate 9 is provided with a cutout through which the projection 43 extends, and a similar cutout is provided for the rigid stop member 42, or these projections 42 and 43 may extend through a common cutout similar to the cutout 36 of plate 2. The plate 9 also carries another rigid stop member 44, and it will be noted that the stop members 29, 30, 42 and 44 are all located along a single straight line so as to be able to cooperate with the colinear edge portions of the film strips which are opposed to the colinear edge portions thereof engaged by the springy stop members 15, 16, 23 and 24. The rigid stop members are arranged along a straight line parallel to that along which the springy stop members are arranged.

The plate 8 has a pair of bosses 45 and 46 fixed to its upper face, and these bosses carry a shaft 47 which turnably supports a plate 48 having lateral upwardly turned portions 49 which form a grip to enable the operator to grasp and manipulate the plate 48 comfortably. The right, downwardly extending free edge portion of the plate 48, as viewed in Fig. 4, has fixed thereto a scraper member 50 made of a suitable plastic material, and the film face of the scraper member 50, as viewed in Fig. 4, is formed with inclined grooves 51. This plate 48 is capable not only of turning about the shaft 47 but also of shifting longitudinally along the shaft 47, and the plate 48 is shown in Figs. 1 and 2 in its rest position where the grooves 51 are directed upwardly. The inclination of the grooves 51 is apparent from Fig. 2.

A snap spring 52 (Fig. 3) is riveted to the holding plate 8, extends downwardly through an opening thereof, and has a curved free end 53 which snaps into an opening 54 of the base 1 so as to releasably hold the holding plate 8 in the operating position thereof which is shown in Fig. 3. The spring 52 urges the plate 8 downwardly toward the film supporting plate 2 so that a film strip may be securely held between the plates 2 and 8.

The right edge 55 of the plate 8, as viewed in Figs. 2 and 4, is directed upwardly and forms a cutting edge 56 (Fig. 4). The front end of the holding plate 8 extends beyond the base 1 by a distance sufficient to enable the operator to comfortably and easily engage the front edge of the plate 8 for turning the latter upwardly or downwardly. When the plate 8 is turned upwardly the spring 52 simply snaps out of the opening 54.

The plate 9 extends forwardly beyond the base 1 to substantially the same extent as the plate 8, and in addition the plate 9 is directed downwardly to a small extent at its front edge portion which is located beyond the base 1. A snap spring 57 is riveted to this lower plate 9 (Fig. 1), and this spring 57 extends in the same way as the spring 52 of plate 8 through an opening of plate 9 downwardly to a cutout 58 of the base 1 into which the curved free end of the snap spring 57 snaps in order to releasably hold the lower plate 9 and upper plate 10 in their operating position, the bottom free end of the spring 57, as viewed in Fig. 1, being curved in the same way as the free end 53 of the spring 52. The left edge 59 of the plate 9, as viewed in Fig. 4, is directed downwardly and forms a cutting edge 60 which cooperates with the cutting edge 3 formed by the right free edge of the plate 2, as viewed in Fig. 4, in a manner described below.

The screws 61 and 62 (Fig. 2) serve to fix to the upper plate 10 a snap spring 63 and a leaf spring 64 (Fig. 4). The snap spring 63 has a downwardly extending leg which terminates in a free curved end portion similar to the end portion 53 of the spring 52, and this end portion of the snap spring 63 extends into a cutout 65 (Fig. 1) of the lower plate 9, so that the snap spring 63 serves to releasably hold the plates 9 and 10 together.

The left free end portion 66 of the leaf spring 64, as viewed in Fig 4, is as wide as the widest film to be spliced by the splicer This free end portion 66 of the leaf spring 64 terminates in a cutting edge 67 which cooperates with the cutting edge 56 of the holding plate 8 in a manner described below. The free end portion 66 of the leaf spring 64 has a pair of opposed lateral projections 68 and 69 which are curved about the opposite lateral edges of the left free edge portion 70 of the plate 10, as viewed in Figs. 2 and 4, and these curved projections 68 and 69 of the leaf spring 64 overlap the upper face of the plate 10, so that these projections cooperate with the plate 10 to limit the extent of downward movement of the leaf spring 64 with respect to the plate 10, as viewed in Fig. 4. At this left edge portion 70 the plate 10 is provided with downwardly bulging portions providing downwardly extending projections 71 which limit the upward movement of the leaf spring 64 with respect to the plate 10, as viewed in Fig. 4. A stop member 72 (Fig. 4) may be fixed either to the plate 9 or to the plate 10 and is located between these plates in order to limit the extent to which the plates move toward each other, so that this stop member maintains between the plates 9 and 10 a space of a predetermined thickness, and it will be noted that the spring 64 has a thickness substantially smaller than the predetermined thickness of the space between the plates 9 and 10. Furthermore, the spring 63 (Fig. 4) causes the spring 64 to be fixed to the plate 10 in spaced relation to the latter as well as in spaced relation to the plate 9, so that the leaf spring 64 is freely movable in the same between the plates 9 and 10 toward either of these plates.

The cutting edge 56 together with its cooperating cutting edge 67 are longitudinally offset with respect to the cutting edge 3 and its cooperating cutting edge 60 by a distance equal to the extent of overlap of the spliced film portions.

The above-described structure operates as follows:

When a pair of film portions are to be spliced together, the plates 9 and 10 are turned upwardly away from the base 1 to an inoperative position, and the holding plate 8 is turned upwardly away from the film supporting 2. Then one of the film end portions is placed on the supporting plate 2 with its emulsion side directed upwardly, and one of the side edges of the film engages the stops 29 and 30 while the other of the side edges engages the springy stops 15 and 16. The film end portion supported by the plate 2 extends at least up to and preferably slightly beyond the cutting edge 3, and the film locating projection 35 extends through a perforation of the film strip. With the film strip in this position the holding plate 8 is turned downwardly until the snap spring 52 engages the cutout 54 of the base 1, so that the film strip is now securely held between the plates 2 and 8. A free end portion of the film strip will be exposed beyond the right edge 55 of the holding plate 8, and the upper emulsion side of this free end portion of the film is moistened. Then the plate 48 is turned in a clockwise direction from the position shown in Fig. 1 through and beyond the position shown in Fig. 4 until the scraper element 50 engages the free end portion of the film located beyond the edge 55 of the plate 8. The operator now shifts the plate 48 back and forth along the shaft 47 so that the face of the scraper element 50 which is provided with the inclined grooves 51 scrapes the emulsion from the free end portion of the film strip. The plate 48 is then returned to its inoperative position shown in Figs. 1 and 2.

Before the plates 9 and 10 are turned downwardly to their operative position, the plate 10 is turned away from the plate 9 and the other film strip is placed on the plate 9 with one of its side edges engaging the rigid stops 42 and 44 and with the other of its side edges engaging the springy stops 23 and 24. The free end of this film strip extends at least up to the cutting edge 67 of the leaf spring 64 and preferably extends slightly beyond this cutting edge, and the film locating projection 43 extends through a perforation of the film strip. With the film thus positioned with respect to the plate 9, the plate 10 is turned toward the plate 9 until the spring 63 snaps ino the opening 65 of the plate 9 so as to hold the plates 9 and 10 together. The film on the plate 9 is releasably held in this manner between the plates 9 and 10.

Now the upper face of the film on plate 2 is coated with a splicing cement at the portion of this face from which the emulsion has been scraped, and the lower non-emulsion side of the film between the plates 9 and 10 is also coated with a splicing cement at the portion of the film which overlaps the free end portion 66 of the spring 64.

After the cement is thus applied, the plates 9 and 10 are quickly turned together downwardly to their operating position, and this action causes the moving cutting edge 60 to cooperate with the stationary cutitng edge 3 for cutting the end of the film carried by the plate 2 and the moving cutting edge 67 to cooperate with the stationary cutting edge 56 to cut the end of the film carried by the plate 9. During this cutting of the film the spring 64 bears against the stop members 71 of the plate 10. When the plates 9 and 10 have reached their operating position, the snap spring 57 snaps into the cutout 58 of the face 1 in order to hold the plates 9 and 10 in their operating position. In this operating position the upper face of the plate 9 is located in exactly the same plane as the upper face of the plate 2. Since the film strips are precisely located on these upper faces, they are accurately spliced together in the proper position with respect to each other.

The overlap portions of the film strips are pressed together solely by the leaf spring 64, since the lower plate 9 is supported by the base 1 and since the upper plate 10 is supported with respect to the lower plate 9 by the spacer member 72. The pressure provided by the spring 64 is distributed uniformly over the entire area of the sides and depends for its magnitude solely upon the characteristics of the spring 64. This pressure provided by the leaf spring 64 does not change appreciably if the upper plate 10 assumes a somewhat different position from that which is intended, as a result of manufacturing tolerances or as a result of foreign matter which becomes lodged in the splicer, or even if the snap spring 57 has a spring force different from that originally provided in the snap spring. The spring 64 can also compensate for changes in the position of the cover plate 10 with respect to the longitudinal axis of the film.

After the film strips are securely joined together, the plate 10 is turned upwardly from the plate 9 and the plate 8 is turned upwardly from the plate 2 so that the spliced film can be removed from the splicer.

The above-described film splicer provides a secure connection between the film strips and guarantees that they are properly joined together because of the stops which engage the side edges of the film strips as well as the film locating projections 35 and 43 which determine the longitudinal positions of the film strips.

It will be understood that each of the elements described above, or two or more together, may also find a useful application in other types of splicers differing from the types described above.

While the invention has been illustrated and described as embodied in film splicers, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a film splicer, in combination, a pair of jointly and independently movable overlying plates between which a film end portion to be spliced to another film end portion is adapted to be carried; support means supporting said pair of plates for movement to and from an operating position where a film end portion carried by said plates is joined to another film end portion; means located between said plates for maintaining a space of predetermined thickness between said plates; and a leaf spring of a thickness substantially less than that of said space located and extending in said space and carried in prestressed condition by one of said plates in a position spaced from both of said plates so that said leaf spring can freely move toward one or the other of said plates, said leaf spring having a free end portion which presses on a film end portion carried between said plates to press the film end portion against another film end portion to which it is being spliced, said free end portion of said leaf spring terminating in a cutting edge which is adapted to cooperate with another cutting edge to cut across a film end portion which is to be joined to the film end portion carried by said plates; stop means provided on said leaf spring and on said one of said plates for limiting the free movement of said leaf spring toward one or the other of said plates, so that the splicing pressure provided by said leaf spring is independent of the pressure required for cutting and is determined only by the characteristics of said leaf spring.

2. In a film splicer as recited in claim 1, said plates respectively forming upper and lower plates when in their operating position and said free end portion of said leaf spring extending beyond said lower plate by a distance equal to the length of overlap between the spliced film end portions.

3. In a film splicer as recited in claim 2, said leaf spring being carried by said upper plate.

4. In a film splicer as recited in claim 2 a stationary plate located in substantially the same plane as said lower plate when the latter is in its operating position and adapted to support a film end portion which is to be spliced to the film end portion carried between said upper and lower plates, said stationary plate having a free edge portion located beneath said free end portion of said leaf spring when said upper and lower plates are in their operating position and said free edge portion of said stationary plate terminating in a cutting edge, said lower plate having directed toward said cutting edge of said stationary plate a downwardly curved free edge which acts as a second cutting edge to cooperate with said cutting edge of said stationary plate to cut film carried by the latter during movement of said upper and lower plates to their operating positions.

5. In a film splicer as recited in claim 2, said upper plate having downwardly extending projections in the operating position of said upper plate, and said projections extending downwardly toward said free end portion of said leaf spring to limit the movement of said free end portion of said leaf spring toward said upper plate.

6. In a film splicer as recited in claim 2, said free end portion of said leaf spring having a pair of opposed lateral projections curved around a pair of opposed free edges of said upper plate and partly overlapping the upper surface of said upper plate for limiting the movement of said free end portion of said leaf spring downwardly from said upper plate.

7. In a film splicer as recited in claim 1, said support means supporting said plates for turning movement about a common axis to and from their operating positions.

8. In a film splicer as recited in claim 1, first snap spring means cooperating with said plates for releasably holding the same together, and second snap spring means cooperating with said support means and both of said plates for releasably holding the latter in their operating positions.

9. In a film splicer, in combination, a pair of film supporting plates having respectively supporting surfaces which are coplanar during actual splicing of a pair of film end portions together; a pair of rigid stop members carried by each of said plates, each of said stop members having a shoulder face substantially perpendicular to said supporting surfaces of said plates and all of said shoulder faces being arranged along a single straight line so as to engage colinear side edges of the film end portions to be spliced; means for adjustably positioning one of the stops connected to each plate along said straight line; and a pair of springy stop members carried by each plate respectively opposite the rigid stop members carried thereby, the pair of spring stop members connected to each plate being in the form of a pair of widening end portions of a part of a leaf spring located beneath each plate in a plane normal thereto and each plate being formed with cutouts through which said widening end portions of said leaf spring respectively extend to an elevation higher than the surface of each plate which carries the film end portion to be spliced, the only portions of said springy stop members extending beyond said supporting surfaces of said plates being substantially perpendicular thereto and all of said portions being arranged along a second straight line parallel to the first-mentioned straight line so that said portions are adapted to engage the film end portions to be spliced only at the other colinear side edges thereof.

References Cited in the file of this patent

UNITED STATES PATENTS

| 1,851,800 | Bogopolsky | Mar. 29, 1932 |
| 2,258,356 | Goldberg | Oct. 7, 1941 |
| 2,468,629 | Herzig et al. | Apr. 26, 1949 |